Jan. 10, 1933.    L. W. THOMPSON    1,894,133
ELECTRICAL REGULATOR
Filed April 29, 1930

Inventor:
Louis W. Thompson,
by Charles V. Tullar
His Attorney.

Patented Jan. 10, 1933

1,894,133

UNITED STATES PATENT OFFICE

LOUIS W. THOMPSON, OF SCHENECTADY, NEW YORK, ASSIGNOR TO GENERAL ELECTRIC COMPANY, A CORPORATION OF NEW YORK

ELECTRICAL REGULATOR

Application filed April 29, 1930. Serial No. 448,393.

My invention relates to electrical regulators and more particularly to means for regulating the voltage of alternating current circuits.

In order that consumers of electrical energy shall receive their energy at a constant voltage, so that load devices and meters will operate at their best efficiency, it is customary to provide automatically operating means for regulating the voltage of the supply on feeder circuits. In the past, the majority of such regulators, while giving good performance, have been relatively large expensive pieces of apparatus involving the use of moving parts. They have consequently been subject to the disadvantages of this class of apparatus. Of late there has been considerable interest in developing a so-called static regulator for this class of work, such a regulator having no moving parts. Many of these static regulators operate on the principle of magnetic saturation to produce a variable voltage boost in their associated circuits. In accordance with my invention I provide an improved static regulator having an increased range of operation in that at no load it produces a voltage buck in the circuit which as the load increases changes to a voltage boost.

An object of my invention is to provide a new and improved static electrical regulator.

Another object of my invention is to provide a new and improved static voltage regulator having an increased range of operation.

My invention will be better understood from the following description taken in connection with the accompanying drawing and its scope will be pointed out in the appended claims.

Figure 1:
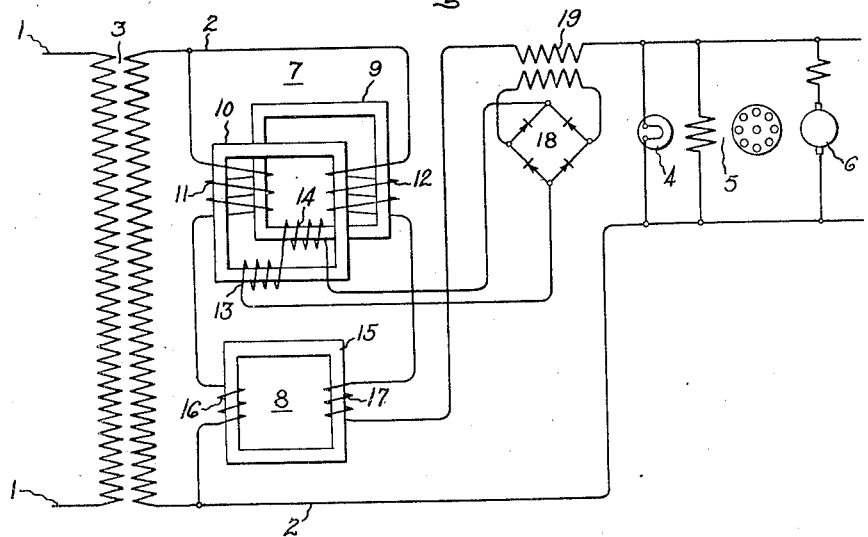
Figure 2:
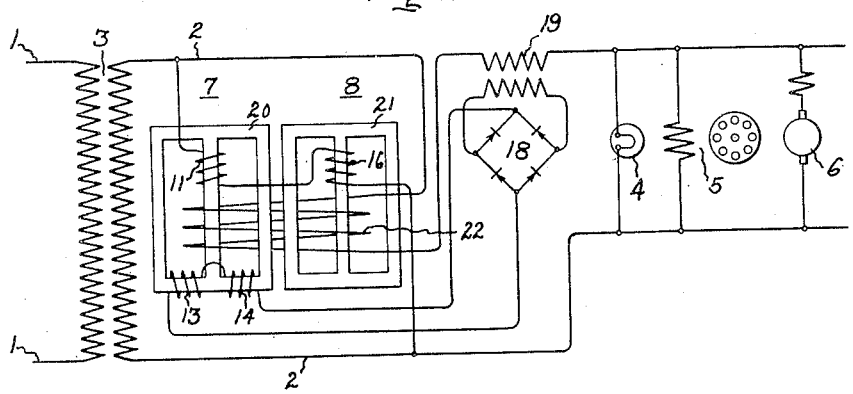

In the drawing, Fig. 1 is a diagrammatic showing of a specific embodiment of my invention while Fig. 2 is a like showing of a modification having a different arrangement of the transformers for producing the voltage boosts and bucks.

Referring now to Fig. 1, wherein I have shown a specific embodiment of my invention as applied to an alternating current feeder circuit which is part of an electrical system of distribution, 1 is an alternating current power supply circuit which supplies energy to a feeder circuit 2 through a suitable transformer, such as a step-down distribution transformer 3. Arranged to be energized from circuit 2 are a plurality of load devices, such as an incandescent lamp 4, an induction motor 5 and an alternating current series motor 6, all three of which may be taken collectively to represent a typical feeder circuit load.

For producing varying degrees of voltage buck and boost in circuit 2 in order to compensate for the varying voltage drop in the circuit with variations in current flow therein I provide a pair of transformers 7 and 8 having their primary windings connected across circuit 2 and their secondary windings connected in circuit 2. Transformer 7, which is the voltage buck producing transformer, may be of any kind although the specific transformer illustrated has certain advantages which will be pointed out hereinafter. As shown this transformer comprises a pair of core members 9 and 10 on both of which are wound a primary winding 11 and a secondary winding 12. A pair of equal direct current saturating windings 13 and 14 are wound on cores 10 and 9 respectively, these windings being so arranged that their magneto-motive forces are in opposite directions with respect to the instantaneous magneto-motive force of primary winding 11. The purpose of this particular arrangement of the cores and saturating windings is to prevent a net alternating voltage being induced in the direct current saturating winding circuit and also to prevent the production of even harmonics in the transformer through an unequal distortion of the two halves of the current wave by the direct current produced flux. Such an unequal distortion would take place if but one core and saturating coil were used for then the magnetic bias produced by the saturating coil would aid the alternating flux during one half of the wave and oppose it during the other, thus working the core at different points on its saturation curve during the two halves of the wave. Transformer 8 may be of any type, such as the simple transformer shown, which has a core 15 on which are wound primary and secondary windings 16 and 17 respectively. As shown primary windings 11 and 16 are connected in series across circuit 2 while secondary windings 12 and 17 are connected in series in circuit 2. Transformers 7 and 8 are so constructed that the former under normal conditions of its magnetic circuit has a high reactance compared with the reactance of the latter or, in other words, under similar conditions the exciting current of the voltage buck producing transformer is low compared to the exciting current of the voltage boost producing transformer. This may be done by any of the ways which are well known to those skilled in the art to which this invention pertains, such as constructing the transformer cores of materials having different magnetic properties.

Direct current saturating windings 13 and 14 may be connected so that their energization varies in accordance with variations in any one or more of the electrical conditions of circuit 2 and in the embodiment illustrated they are connected to be energized through a suitable rectifier in accordance with variations of the current in circuit 2. The rectifier may be of any type such as the full wave copper-copper oxide type shown at 18. The direct current terminals of this rectifier are connected to the saturating windings 13 and 14 while its alternating current terminals are preferably connected in circuit 2 through a current transformer 19 so as to reduce the magnitude of the current which must traverse the saturating current winding, although it will of course be obvious to those skilled in the art that they might be connected directly in circuit 2 if desired.

The operation of the embodiment shown in Fig. 1 is as follows: Assume that circuit 1 is connected to a suitable source of alternating current (not shown) and that circuit 2 is unloaded or very lightly loaded. Under these conditions, as the reactance of transformer 7 is high compared to that of transformer 8, most of the total voltage drop in both of the primary windings 11 and 16 will appear across the terminals of primary winding 11. Consequently, as the secondary winding voltages are in proportion to their respective primary winding voltages, the voltage buck produced by winding 12 will greatly exceed the voltage boost produced by winding 17. The no load voltage of circuit 2 at the terminals of the load devices will thus equal the ordinary no load voltage of circuit 2 minus the net voltage buck produced by the transformers. If a load is applied to circuit 2, the current flow therethrough will increase the saturation of transformer 7 through the action of the rectifier and saturating windings. The result of the increase in the saturation of transformer 7 is to decrease its reactance, thus increasing its normal exciting current. The decrease in the reactance of transformer 7 causes the voltage across its primary winding to decrease, thus causing the voltage across the primary winding of transformer 8 to increase. Consequently as the load increases the voltage buck of transformer 7 decreases while the voltage boost of transformer 8 increases, or, in other words, the net voltage buck decreases. As the load increases further and the saturation of transformer 7 increases the voltage boost of transformer 8 will exceed the voltage buck of transformer 7 and a net voltage boost will be produced. In a similar manner, decreases in load on circuit 2 reverses the above described operation.

The embodiment shown in Fig. 2 differs from Fig. 1 mainly in that transformers 7 and 8 have a common secondary winding 22. These transformers also have modified cores 20 and 21 respectively. As shown, secondary winding 22 links the center leg of each core. Saturating windings 13 and 14 are so connected that their mutual flux traverses the two outer legs of core 20. Through this arrangement the same advantages are achieved as by the particular arrangement in Fig. 1.

The operation of the embodiment shown in Fig. 2 is the same as that of Fig. 1 except that the voltage bucks and boosts are produced in the same winding instead of in separate windings.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. In a regulating system, in combination, an alternating current circuit, a transformer connected to said circuit so as to produce a voltage boost therein, a second transformer connected to said circuit so as to produce a voltage buck therein, means connecting the primary windings of said transformers in series, said second mentioned transformer having a higher normal reactance than said first mentioned transformer, and means responsive to an electrical condition of said circuit for varying the reactance of said second mentioned transformer.

2. In a regulating system, in combination, an alternating current circuit, a transformer connected to said circuit so as to produce a voltage boost therein, a second transformer connected to said circuit so as to produce a voltage buck therein, the primary windings of said transformers being connected in series, the reactance of said bucking transformer inherently being high with respect to the reactance of said boosting transformer whereby the majority of the total voltage drop in said primary windings under no load conditions is across the primary winding of said bucking transformer, and means for saturating the bucking transformer to decrease thereby its reactance in proportion to variations in an electrical condition of said circuit.

3. A regulating system, having in combination, an alternating current circuit, a transformer connected to produce a voltage boost in said circuit, a second transformer connected to produce a voltage buck in said circuit, the primary windings of said transformers being connected in series across said circuit, the ratio of the reactance of said first mentioned transformer to the reactance of said second transformer being normally less than unity, and means for making this ratio greater than unity through varying the saturation of said second transformer in proportion to variations in the current in said circuit.

4. In combination, an alternating current circuit, a pair of transformers, means connecting the primary windings of said transformers in series across said circuit, means connecting the secondary windings of said transformers in series in said circuit in such a way that their voltages are opposed to each other, one of said transformers having a higher normal reactance than the other, and means for decreasing the reactance of said transformer through variation of its saturation in accordance with variations in an electrical condition of said circuit.

5. A regulating system, having in combination, an alternating current circuit, a pair of transformers, means connecting the primary windings of said transformers in series across said circuit, means connecting the secondary windings of said transformers in series in said circuit so that one transformer produces a voltage buck in said circuit while the other transformer produces a voltage boost in said circuit, said voltage bucking transformer having a higher normal reactance than said voltage boosting transformer, a direct current saturating winding on said voltage bucking transformer, and means including a rectifier for connecting said saturating winding to said alternating current circuit so that the current therein is proportional to the current in said circuit.

6. A voltage regulating system, having in combination, an alternating current circuit, a voltage bucking transformer comprising a pair of separate core members, a primary winding linking both cores, a secondary winding linking both cores and a pair of saturating windings, one on each core, a voltage boosting winding having a primary winding and a secondary winding, said voltage boosting winding having a normal exciting current which is higher than the normal exciting current of said bucking transformer, said primary windings being connected in series across said circuit, said secondary windings being connected in series in said circuit, a rectifier having direct current output terminals and alternating current input terminals, means connecting said input terminals in said circuit, means connecting said output terminals to said saturating windings so that the individual magneto-motive forces of said individual saturating windings are opposite with respect to the instantaneous magneto-motive force of the primary winding of said bucking transformer.

7. In a system of distribution, in combination, an alternating current power supply circuit, a feeder circuit, a distribution transformer connecting said circuits, a voltage bucking transformer and a voltage boosting transformer, said transformers having a common secondary winding connected in said feeder circuit and separate primary windings connected in series across said feeder circuit, the primary winding of said bucking transformer consuming most of the total voltage drop in both said primary windings, a saturating winding on said bucking transformer, and means including a rectifier connecting said saturating winding to said feeder circuit so that its energization varies in proportion to variations in the current in said circuit.

In witness whereof, I have hereunto set my hand this 24th day of April, 1930.

LOUIS W. THOMPSON.